United States Patent [19]

Sorenson et al.

[11] 3,980,500

[45] Sept. 14, 1976

[54] RESEALABLE VENT FOR PLASTIC BATTERY CASE

[75] Inventors: Dennis Dean Sorenson, Bloomington, Minn.; Richard Allan Erickson, New Richmond, Wis.

[73] Assignee: Gould Inc., Chicago, Ill.

[22] Filed: May 30, 1975

[21] Appl. No.: 582,233

[52] U.S. Cl. ................................. 429/54; 429/55; 429/82
[51] Int. Cl.² ...................... H01M 2/02; H01M 2/12
[58] Field of Search ........... 136/166, 111, 177, 178; 220/367

[56] References Cited
UNITED STATES PATENTS

| 3,648,337 | 3/1972 | Greskamp | 136/166 |
| 3,660,169 | 5/1972 | Clune | 136/166 |
| 3,661,650 | 5/1972 | Flyn | 136/178 |
| 3,887,394 | 6/1975 | Kaye | 136/166 |

FOREIGN PATENTS OR APPLICATIONS

| 701,642 | 12/1953 | United Kingdom | 136/166 |

*Primary Examiner*—Donald L. Walton
*Attorney, Agent, or Firm*—Leydig, Voit, Osann, Mayer & Holt, Ltd.

[57] ABSTRACT

A resealable vent for a secondary cell having a flat plastic case including a resilient ball seated in an apertured passage with a predetermined amount of compression and adapted to unblock an opening in the passage and vent gaseous material upon an excessive build-up of internal pressure within the cell case, for example, during recharging at an accelerated rate.

10 Claims, 10 Drawing Figures

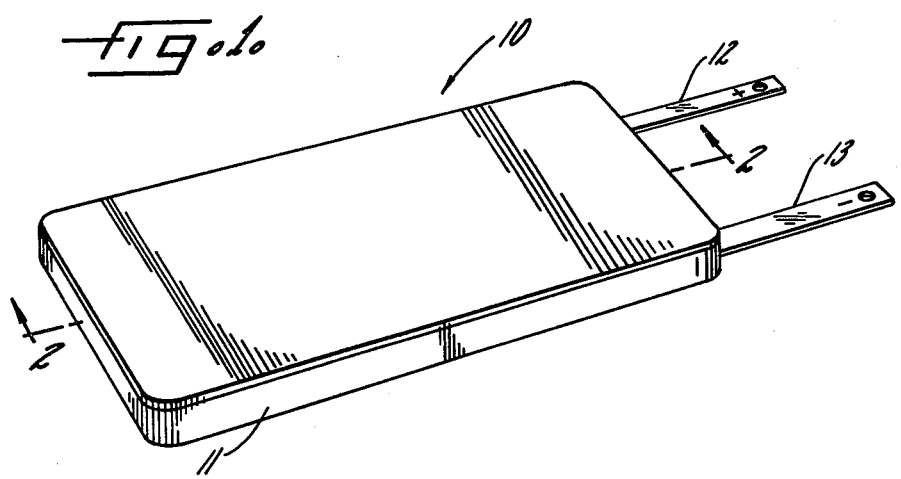
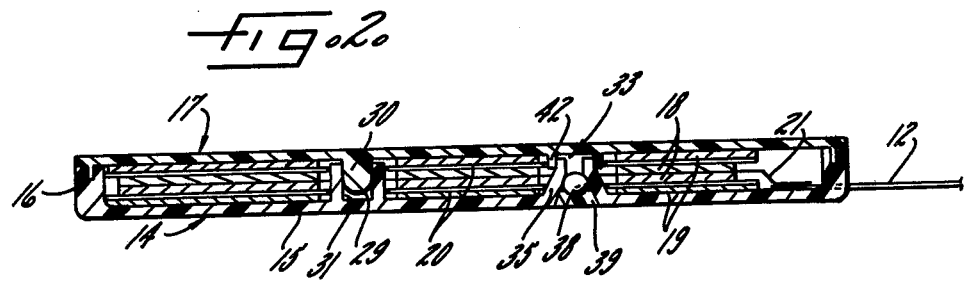
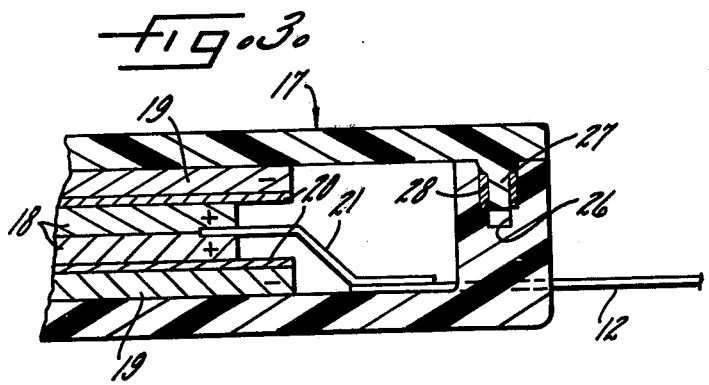
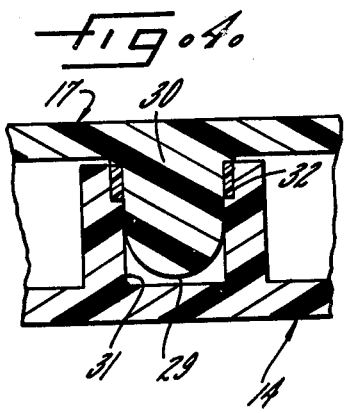

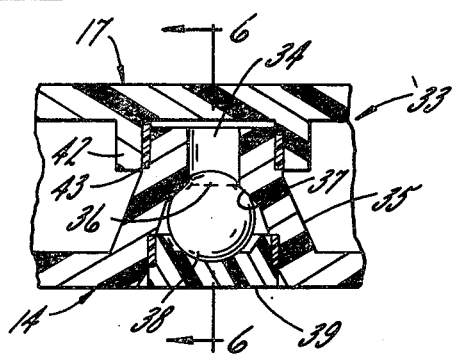
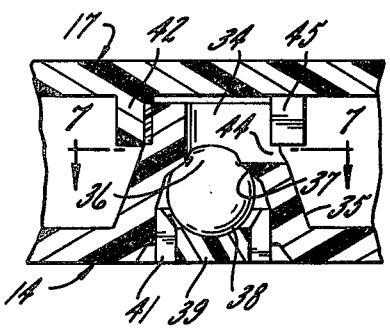
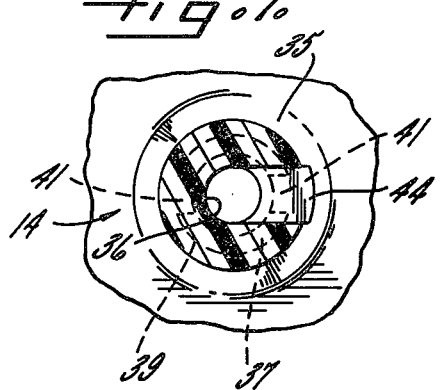
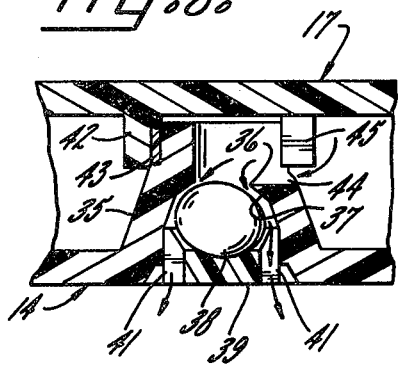
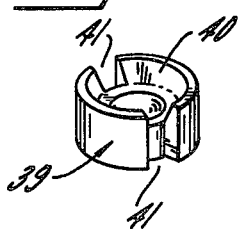
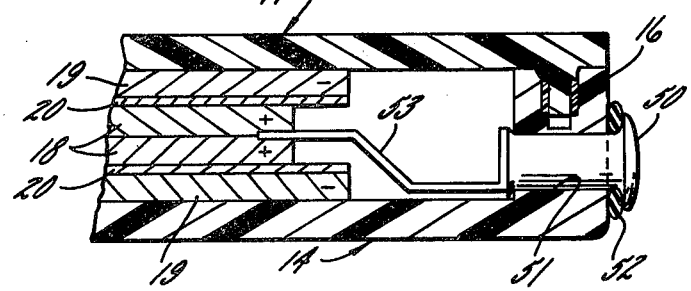

RESEALABLE VENT FOR PLASTIC BATTERY CASE

BACKGROUND OF THE INVENTION

The present invention relates generally to rechargeable battery cells and more particularly concerns a resealable vent for such a cell having a flat plastic case.

During recent years there has been a tremendous growth in the manufacture and use of miniature electronic devices such as hand-held calculators. Most of these devices are designed to operate on self-contained batteries in addition to be operable when plugged into a conventional electrical outlet, with or without an adapter. Many of the battery operated models utilize rechargeable batteries which, if properly and periodically recharged, last for long periods of time before replacement is required. However, one of the limitations on the physical design of hand-held calculators and the like which use rechargeable batteries has been the size and shape of conventional rechargeable batteries, most of which are cylindrical in shape, relatively space consuming, and housed in metal cases. Moreover, if either the shape or the material of the battery case is changed problems of case deflection and possible rupture due to internal pressure are encountered.

Accordingly it is the primary aim of the present invention to provide a resealable vent in a flat plastic case for a rechargeable battery cell.

A more specific object is to form such a resealable vent out of inexpensive materials which nevertheless provide for reliable venting when a predetermined internal pressure is reached.

It is a more detailed object to provide a resealable vent in a flat plastic battery cell case which also forms part of an internal restraint to prevent bulging or other deformation of the case upon a build-up of internal pressure within the case below venting pressure.

These and other objects and advantages of the invention will become apparent upon reading the following detailed description and upon reference to the drawings, in which:

BRIEF DESCRIPTION OF THE DRAWINGS

FIG. 1 is a perspective view of the flat battery cell case which includes the resealable vent of the present invention;

FIG. 2 is a section taken along line 2—2 in FIG. 1;

FIGS. 3, 4 and 5 are enlarged fragmentary sections, respectively, of the right-hand, left center and right center portions seen in FIG. 2;

FIGS. 6 and 7 are enlarged fragmentary sections taken along lines 6—6 in FIG. 5 and 7—7 in FIG. 6, respectively;

FIG. 8 is an enlarged fragmentary section, similar to FIG. 6 illustrating operation of the resealable vent of the present invention;

FIG. 9 is an enlarged perspective view of the vent cap; and,

FIG. 10 is an enlarged fragmentary section, similar to FIG. 5, showing a modified terminal connector.

DETAILED DESCRIPTION OF THE INVENTION

While the invention will be described in connection with certain preferred embodiments and procedures, it will be understood that we do not intend to limit the invention to those specific embodiments and procedures. On the contrary, we intend to cover all alternatives, modifications and equivalents as may be included within the spirit and scope of the invention as defined by the appended claims.

Turning now to the drawings, there is shown in FIG. 1 a rechargeable battery cell 10 having a thin, flat case 11 and positive and negative terminals 12 and 13. As most clearly shown in FIG. 2, the cell case 11 includes a shallow, substantially flat base 14 having a bottom panel 15 with a low peripheral wall 16 at the sides and ends and a thin, flat cover 17 having a peripheral edge adapted to sealingly engage the peripheral wall 16. Within the case 11 are the positive and negative electrodes 18, 19 between which are separators 20 which contain the electrolyte material. The positive electrodes 18 are connected to the positive terminal 12 by a connector 21 (see FIG. 3) and the negative electrodes 19 are similarly connected to the negative terminal 13 by a pair of connector elements (not shown).

In the preferred embodiment, the flat base 14 and cover 17 are separately molded from plastic material and are subsequently bonded together to form the case 11 after the electrodes 18, 19 and separators 20 are in place. The plastic material used may be an ABS resin, a high impact polystyrene or a polysulfone material. It should be caustic resistant as well as being quickly and conveniently bonded such as by solvent, thermal or ultrasonic bonding techniques, the latter being preferred. In the embodiment shown in FIGS. 1, 2 and 3, the terminals 12, 13 are molded in the base 14 so as to lie on the bottom panel 15 and extend through the peripheral wall 16 at the end of the base. To insure a gas-tight seal between the terminals, which may be made of nickel, and the base 14, the terminals are preferably coated with a plastic and solvent mixture in the area where they extend through the wall 16 before the base 14 is molded.

As shown in FIGS. 2 and 3, the peripheral wall 16 of the base 14 is preferably formed with a groove 26 and the peripheral edge of the cover 17 is formed with a mating tongue 27. The tongue 27 is slightly larger than the groove 26 permitting a force fit and, when ultrasonic energy is applied to the joint, molten plastic flows into any voids or irregularities between the tongue 27 and groove 26. When this molten plastic solidifies as indicated at 28, a gas-tight seal is formed. It will be understood, however, that other bonding techniques can also be employed.

To prevent the flat cover and bottom panel 15 of the base 14 from bulging upon a build-up of internal pressure within the sealed case 11 opposing means are provided on the base 14 and cover 17 internally of the peripheral wall 16 and edge and are adapted to be secured to one another. It will be appreciated that such internal pressure is generated within the case 11, particularly during recharging of the battery cell 10 and the pressure build-up increases as the rate of charging increases. Moreover, the force exerted on the cover, for example, is also dependent on its area and the deflection of the cover varies exponentially with distance between points of support.

Referring now to FIG. 4 it will be seen that the internal restraint is in the form of a pin 30 extending downwardly from the cover 17 and is received in and secured to a socket 31 formed in the base 14. Various forms of bonding may be employed to secure the pin 30 to the socket 31, but ultrasonic bonding is preferred with the subsequently solidified molten material indicated at 32. It should also be understood that the socket 31 and pin 30 may have various cross-sectional shapes such as circular, triangular, square, rectangular (in which case the terms mortise and tenon would aptly apply) or other geometric configurations. Preferably, however, the pin 30 is somewhat pointed or rounded at its tip 29 to provide for centering and ease of initial insertion in the socket 31.

In accordance with the present invention, the cell case 11 is provided with a resealable vent 33. As shown in FIGS. 5–8, the vent 33 includes a passage 34 formed by the interior of a hollow pin 35 integrally molded in the bottom panel 15 of the base 14. The upper end of the passage 35 has an internal opening 36 of reduced cross-sectional area and is surrounded by a seat 37. Within the passage 34 a resilient element 38 is normally disposed on the seat 37 blocking the opening 36. As shown in the drawings, the resilient element is in the form of a ball and is preferably made of neoprene rubber having durometer rating of 70 ± 5 shore. It will be understood, however, that other shapes, materials and hardness for the resilient element 38 may be used depending on the pressure at which the vent 33 is intended to operate.

Pursuant to the present invention, the resilient element 38 is normally compressed against the seat 37 by a cap 39 which is bonded in the outer end of the passage 34 substantially flush with the outer surface of the panel 15. The cap 39 includes a central socket 40 which engages the resilient ball and a plurality of apertures 41 which communicate with the passage 34 and the exterior of the case 11. By properly selecting the size and deformation characteristics of the resilient element relative to the size of the opening 36 and the amount of initial compression exerted on the element 38 by the cap, the element 38 will remain seated until the internal pressure within said case reaches a predetermined level. For example, a sealed nickel cadmium cell normally operates with an internal gas pressure on the order of 10 to 30 p.s.i. depending on the charge current. Accordingly, the resilient ball 38 may be initially compressed by the cap 39 so that it unseats (see FIG. 8) and vents gas through the apertures 41 at an internal pressure of 50 p.s.i.

According to a further aspect of the invention, the vent 33 forms part of an internal restraint for the case 11.

As shown in FIGS. 5 and 6 the pin 35 extends up from the base 14 and is received in and secured to a socket 42 formed in the cover 17. Preferably the hollow pin 35 is ultrasonically bonded to the socket 42 with the subsequently solidified molten material indicated at 43. To permit gas to enter the passage 34, the hollow pin 35 is provided with a lateral recess in the form of a slot 44 and the socket 42 is likewise slotted at 45. The flat base 14 and cover 17 with the internal restraints of the present invention, however, will remain dimensionally stable without bulging up to an internal pressure on the order of about 120 p.s.i. When the vent 33 is set to discharge gas at a pressure of about 50 p.s.i., this insures that a reasonable safety margin is maintained for the flat cell 11 of the present invention.

If desired, the battery 10 may be provided with circular or button terminals 50 as shown in the modified embodiment of FIG. 10. Such a terminal 50 may be in the form of a metal (e.g. nickel) rivet inserted in an aperture 51 in the peripheral wall 16 of the base 14. An O-ring 52 is preferably mounted on the rivet 50 between its head and the wall 16 and is compressed when the rivet is clinched. This insures that a gas-tight seal is provided between the terminal 50 and the base 14. The terminal 50 may be welded to an internal connector 53, similar to the connector 21 shown in FIG. 3.

It should be understood that a flat cell case 11 of the present invention is particularly suited to enclose a rechargeable nickel-cadmium cell. However, it is also suitable for other rechargeable cells. Moreover, while a thin, flat substantially rectangular case 11, as illustrated, is preferred, the invention is not limited to that configuration but could also be employed in a square or disc shaped cell, for example. Finally, while the foregoing description and the claims which follow employ the term "cell" it should be appreciated that multiple cells could be suitably stacked or arrayed within the case 11 without departing from the invention.

We claim as our invention:

1. A resealable vent for a battery cell having a plastic case comprising, in combination, a passage defined by the interior of a hollow pin integrally formed with and projecting inwardly from one wall of said case and with the inner end thereof bonded to the opposite wall of said case for venting gaseous material from the interior of said case, said passage including an internal opening of reduced cross-sectional area and a seat surrounding said opening, a seal element disposed within said passage normally blocking said opening, and means for normally compressing said seal element against said seat, said seal element being further compressible against said means to unblock said opening and vent gaseous material out through said passage upon being subjected to an internal pressure at said opening above a predetermined level.

2. A resealable vent as defined in claim 1 wherein said inner end of said hollow pin is received in and bonded to a socket integrally formed in said opposite wall.

3. A resealable vent as defined in claim 2 wherein said hollow pin and said socket each include at least one laterally extending recess aligned with one another and communicating with said opening.

4. A resealable vent as defined in claim 1 wherein said hollow pin includes at least one laterally extending recess communicating with said opening.

5. A resealable vent as defined in claim 4 wherein said compressing means includes an apertured cap and said seal element is resilient.

6. A resealable vent as defined in claim 5 wherein said cap is formed with a plurality of apertures.

7. A resealable vent as defined in claim 5 wherein said passage is integrally formed in said wall of said plastic case and said apertured cap is formed of plastic material and is bonded to the outer end of said passage.

8. A resealable vent as defined in claim 7 wherein said passage and said cap are substantially circular in cross-section and said cap is bonded to the outer end of said passage substantially flush with the outer surface of said one wall.

9. A resealable vent as defined in claim 8 wherein said apertured cap is ultrasonically bonded to the outer end of said passage.

10. A resealable vent as defined in claim 5 wherein said resilient element is a neoprene rubber ball having a durometer rating of about 70 shore.

* * * * *